(12) United States Patent
Bettinger, II et al.

(10) Patent No.: US 12,026,774 B1
(45) Date of Patent: *Jul. 2, 2024

(54) SYSTEM AND METHOD FOR OPERATING A FAMILY OF MUTUAL FUNDS OR ETFs

(71) Applicant: Charles Schwab & Co., Inc., San Francisco, CA (US)

(72) Inventors: Walter W. Bettinger, II, Menlo Park, CA (US); Marie A. Chandoha, San Francisco, CA (US); Jonathan De St Paer, San Francisco, CA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/505,491

(22) Filed: Oct. 19, 2021

Related U.S. Application Data

(63) Continuation of application No. 16/666,199, filed on Oct. 28, 2019, now Pat. No. 11,151,651, which is a continuation of application No. 14/328,229, filed on Jul. 10, 2014, now Pat. No. 10,460,389.

(60) Provisional application No. 61/844,819, filed on Jul. 10, 2013.

(51) Int. Cl.
*G06Q 40/04* (2012.01)

(52) U.S. Cl.
CPC .................. *G06Q 40/04* (2013.01)

(58) Field of Classification Search
USPC .......................................................... 705/37
See application file for complete search history.

(56) References Cited

U.S. PATENT DOCUMENTS

| | | | | |
|---|---|---|---|---|
| 7,865,426 B2 * | 1/2011 | Volpert | ................. | G06Q 40/06 705/37 |
| 8,249,974 B1 * | 8/2012 | Menon | ................. | G06Q 40/00 705/36 R |
| 8,306,892 B1 * | 11/2012 | Gross | ................. | G06Q 40/06 705/36 R |
| 8,438,100 B2 * | 5/2013 | Tucker | ................. | G06Q 40/06 705/37 |
| 8,566,223 B2 * | 10/2013 | Walia | ................. | G06Q 40/06 705/37 |
| 8,706,599 B1 * | 4/2014 | Koenig | ................. | G06Q 40/06 705/36 R |
| 2005/0187858 A1 * | 8/2005 | Graham | ................. | G06Q 40/04 705/37 |
| 2006/0212380 A1 * | 9/2006 | Williams | ................. | G06Q 40/06 705/35 |
| 2007/0112657 A1 * | 5/2007 | Huber | ................. | G06Q 40/00 705/35 |
| 2010/0169126 A1 * | 7/2010 | Chatter | ................. | G06Q 40/06 705/4 |

(Continued)

OTHER PUBLICATIONS

Business Wire/Newswire, Fitch Affirms Two Morgan Stanley Institutional Liquidity Portfolios at 'AAAmmf', Oct. 23, 2012, Business Wire, Dateline/New York regarding Morgan Stanley Investment Management Inc., Copyright 2012 Business Wire, 3 pages. (Year: 2012).*

*Primary Examiner* — Benjamin S Brindley
(74) *Attorney, Agent, or Firm* — Harness, Dickey & Pierce, P.L.C.

(57) ABSTRACT

A system and method operates a family of exchange traded funds or mutual funds with different weighted average maturities.

18 Claims, 3 Drawing Sheets

(56) References Cited

U.S. PATENT DOCUMENTS

| | | | | |
|---|---|---|---|---|
| 2012/0290462 A1* | 11/2012 | Mehta | ................... | G06Q 40/04 |
| | | | | 705/37 |
| 2012/0310811 A1* | 12/2012 | Patel | ..................... | G06Q 40/04 |
| | | | | 705/37 |
| 2012/0317052 A1* | 12/2012 | Heyner | ................. | G06Q 40/06 |
| | | | | 705/36 R |

* cited by examiner

SYSTEM AND METHOD FOR OPERATING A FAMILY OF MUTUAL FUNDS OR ETFs

CROSS REFERENCE TO RELATED APPLICATIONS

This application is a continuation of U.S. patent application Ser. No. 16/666,199 entitled, "System and Method for Operating a Family of Mutual Funds or ETFs" filed by Walter Bettinger II, Marie Chandoha and Jonathan de St Paer on Oct. 28, 2019, which is a continuation of U.S. patent application Ser. No. 14/328,229 entitled, "System and Method for Operating a Family of Mutual Funds or ETFs" filed by Walter Bettinger II, Marie Chandoha and Jonathan de St Paer on Jul. 10, 2014, which claims the benefit of U.S. Provisional Patent Application Ser. No. 61/844,819, entitled "Method and Apparatus for Operating a Family of Mutual Funds or ETFs" filed on Jul. 10, 2013 by Walter Bettinger II, Marie Chandoha and Jonathan de St Paer, having the same assignee as the present invention, and is hereby incorporated by reference in its entirety.

FIELD OF THE INVENTION

The present invention is related to computer software and more specifically to computer software for operating financial funds.

BACKGROUND OF THE INVENTION

Conventional money market mutual funds use a share price of a dollar and pay dividends via share increases, holding the net asset value of each of the shares in the mutual fund at a price of one dollar per share as the total value for the fund rises. If a money market mutual fund has one or more investments where the party receiving the funds for an investment partially or totally defaults, the net asset value of the money market mutual fund could be less than a dollar. Under current regulations, if the net asset value of a money market mutual fund drops below a dollar, the fund would be required to cease operations. What is needed is a different approach to investing.

SUMMARY OF INVENTION

A system and method operates a family of mutual funds or ETFs.

Each fund in the family of funds shares some operating features in common, and the party that manages such fund may, directly or indirectly, advertise some or all of such features. The features of each fund may include an average fund duration of less than one year and/or each fund holding securities of high credit quality, for example, rated A– or above. A– is used in one embodiment, but securities having other credit ratings may be used in other embodiments.

Each fund in the family has a different weighted average maturity range, within which the weighted average maturity of the fund may be selected. In one embodiment, the weighted average maturity of each fund in the family is a number of days that may not be outside the range of that respective fund. The different ranges may each start at zero and have different maximums, or the ranges may differ within a range, so that, for example, one fund has a weighted average maturity range of 20-30 days, and another has a weighted average maturity range of 110-120 days. In one embodiment, each fund in the family has a completely different weighted average maturity range from the other funds in the family, for example, one fund having a weighted average maturity range of 0-30 days, another fund having a weighted average maturity range of 31-89 days and another fund having a weighted average maturity range of 90-180 days. The weighted average maturity ranges may be contiguous as with the prior example, or they may have one or more gaps between them, for example, if the weighted average maturity range of the middle fund in the example above was 35-89 or 35-85 days. In one embodiment, instead of one or more gaps of weighted average maturities, there are one or more overlaps in the weighted average maturities of the funds in the family, for example if the weighted average maturity of the middle fund in the example above was 25-89 or 25-95 days. In one embodiment, each gap or overlap in weighted average maturity is less than 30%, 25%, 20% or 10% of the weighted average maturity range of the fund with the smallest or largest such range or the total range of all the funds in the family. In another embodiment, the weighted average maturity range of one or more funds completely overlaps one or more other funds, or the weighted average maturity range of a fund may completely consume all of the smaller duration ranges of the other funds in the family, for example, with weighted average maturities of 0-30, 0-90 and 0-180 days, respectively for a family of three funds, though other numbers of funds in the family may be used. Though maturities and weighted average maturities are used herein to describe the family funds, the funds in the family may also or instead be differentiated using different weighted average duration ranges or different asset classes.

To operate the funds, a first fund in the family is selected. If the family uses mutual funds, shares of the selected mutual fund that were sold or bought by investors before the last quoted price are sold or redeemed for cash at that quoted price, which, as noted below, is the quoted price at the end of each trading day. In other embodiments, after hours orders are permitted.

If the family of funds of different weighted average maturities uses ETF's, creation units are sold to, and redeemed from, authorized participants in exchange for in-kind securities and/or cash at the end of the trading day, though orders may be placed throughout the day. The in-kind securities are specified by the ETF provider.

In-kind securities may be specified using any of several techniques. In one embodiment, in-kind securities for sale of creation units are the same as those for redemption, though in another embodiment, the in-kind securities for sale may be different from those for redemption because the make-up of the fund has changed between the date the creation unit or units were sold to the authorized participant and the date the creation unit or units were redeemed by the fund. The in-kind securities for purchase are those the fund wishes to receive to move the weighted average maturity (or duration) to a target or maintain the weighted average maturity at its current target if that target is optimal at the time, even though the target could change at a different time. The in-kind securities for redemption may be those the fund has or those the fund wishes to dispose of, such as shorter maturity securities or lower yielding securities.

In one embodiment, the differences between in-kind securities used for sale of creation units and those used for redemptions are in the length of maturity: for example, specifying longer maturities for sale than for redemption. In one embodiment, the maturity is the only difference, so, for example, if a bond from IBM having a 120 day maturity is one of the in-kind securities for sale of the creation units, a bond from IBM having less than 30 day maturity may be the corresponding in-kind security for redemption.

In one embodiment, the in-kind securities are specified as several classes of several securities in each of one or more of the classes, as well as a proportion of each class that is to be provided and a total amount; creation units may be purchased and redeemed for the total amount, paid by the party receiving the creation units selecting any securities in each class, in the proportions or amounts specified, with any rounding errors made up in cash.

Any cash received by a mutual fund or ETF may be used to purchase securities, using any of several constraints identified by the fund manager, or identified using inputs provided by the fund manager. For example, if the fund manager identifies the date of an event that the fund manager believes will cause interest rates to rise, the system and method may identify a constraint that no securities will be purchased having a maturity past that date, but that the target weighted average maturity of the entire portfolio for the fund should be a number of days until the date of the event or a different date.

The fund manager may also identify a universe of securities from which purchases may be made, and formulas for evaluating one security over another, such as AA-rated securities should provide at least X % of the return of A-rated securities. Cash deficits may cause the securities in the portfolio of the fund to be sold, using constraints or inputs from the fund manager. Using the example above of the event, a preference for securities to sell may be made for those having maturities after the event that is expected to cause interest rates to rise, and the formulas may be used to determine which securities to sell.

In one embodiment, the events, formulas, and target weighted average maturity (or duration) may be used to replace securities within the portfolio to try to achieve the target weighted average maturity, taking into account the information about the events and the formulas, as well as the tax effects of making such trade, and the in-kind securities to be provided in a redemption in the near future.

Quotation information for the selected fund may be provided, such as NAV or other related quotations, at the time or times quotations for such type of funds are provided conventionally. The quotation information may be provided to a conventional quotation server or servers, which process high volumes of inputs and requests for quotations. If there are more funds, the next fund in the family is selected, and the process described above repeats for the newly selected fund. Otherwise, after an optional wait period, the first fund in the family is selected and the process repeats using that fund.

Except for the features noted herein, all funds of a type (e.g. ETF, mutual fund, etc.) are operated in a conventional manner for that type.

DETAILED DESCRIPTION OF A PREFERRED EMBODIMENT

Figure 1:
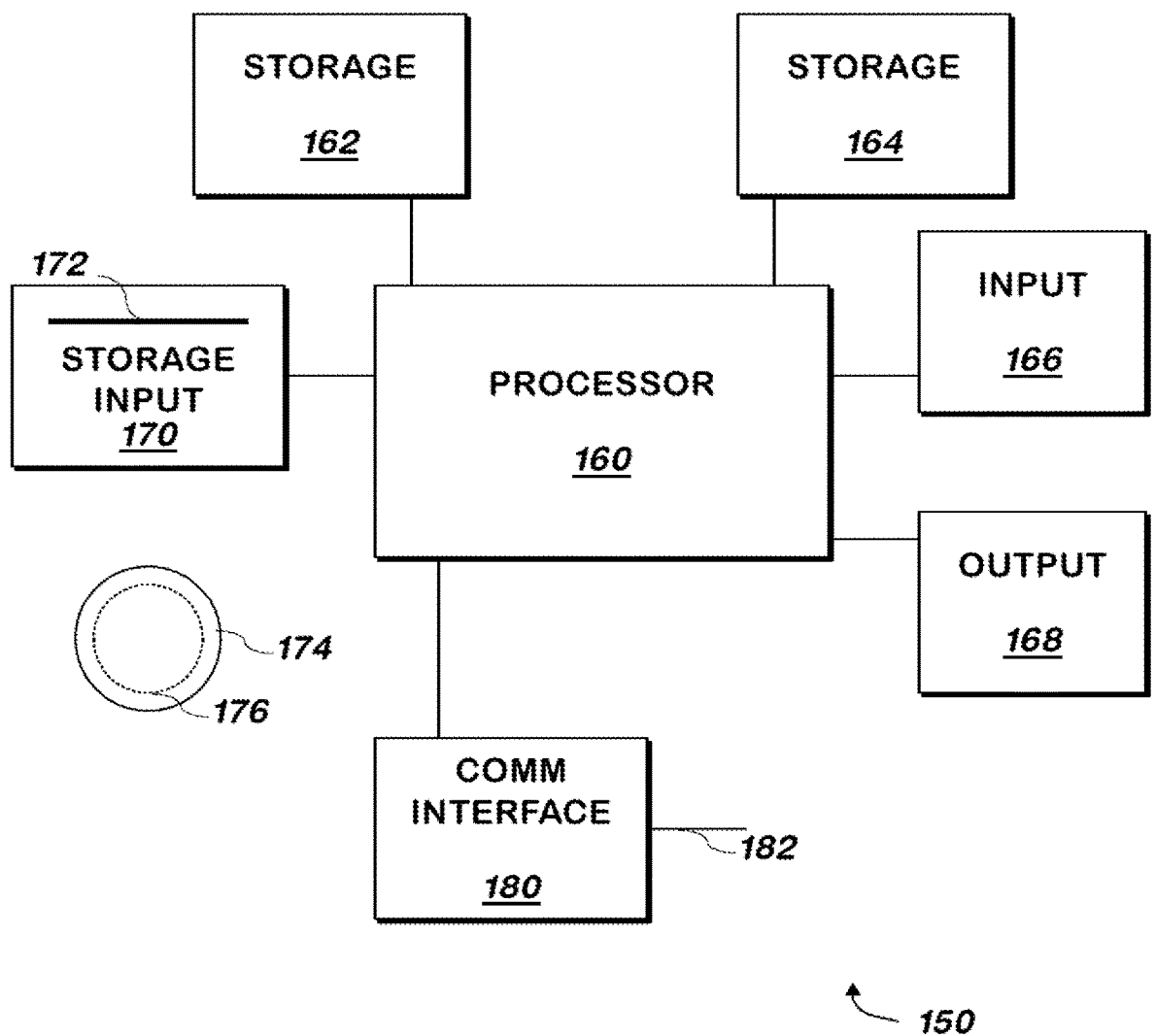
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as XP, VISTA, or 7) commercially available from MICROSOFT Corporation of Redmond Washington or a Macintosh computer system running the MACOS or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Method.

Figure 2:
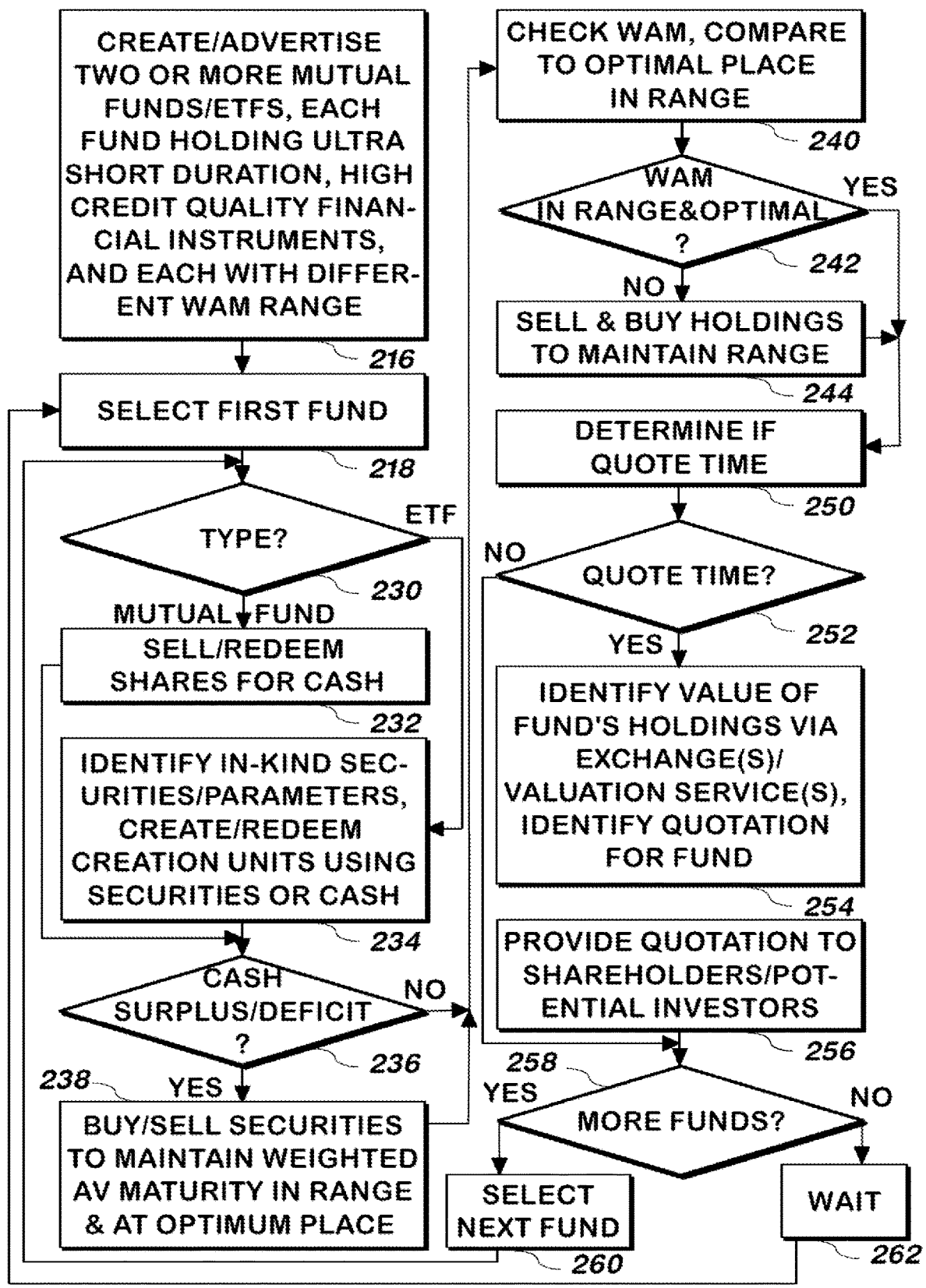
FIG. 2 is a flowchart illustrating a method of operating funds according to one embodiment of the present invention.

FIG. 2 is a flowchart illustrating a method for creating, advertising, and operating funds according to one embodiment of the present invention.

Create/Advertise Two or More ETFs/Mutual Funds, Holding Ultra Short Duration and/or Maturity, High Credit Quality Financial Instruments, Each with Different WAM Ranges.

Referring now to FIG. 2, a "family" of two or more funds, such as a family of two or more Exchange-Traded Funds (ETFs) or a family of two or more mutual funds, is created and advertised, and each of such two or more funds included in the family are operated with the following characteristics: an ultra short weighted average maturity and/or duration; fund holdings that are each high credit quality investments; and a weighted average maturity (WAM) range which is different than that of any of the other one or more ETFs and/or mutual funds in the family 216 as described above. In one embodiment, returns corresponding to each of the funds of the same type (ETF or mutual fund) in the family may also differ from the other funds in the family, and after a conventional period of fund operation, the historical returns corresponding to each fund of the same type in the family may additionally differ from the historical returns corresponding to each of the other one or more family funds. In one embodiment, a family of funds may have only one type of funds, either ETFs or mutual funds or still a different type of fund, and in another embodiment, a family of funds may have multiple types of funds.

In one embodiment, securities or investments with a high credit quality or financial rating are identified as those designated with a credit quality rating of A- or above, and as described herein, only such high credit quality rated securities are added to the holdings of any fund in the family.

In one embodiment, the funds in the family created and advertised may be two or more ETFs, or two or more mutual funds, each of which operates as described herein. The weighted average maturity (WAM) of the security holdings of each fund, which may be calculated based on the length of maturity and the dollar value of any investments held by each fund, is ultra short (e.g. twelve months or less).

Each of two or more funds included in the family is created and advertised with a different (ultra short) WAM range than each of the other one or more funds in the family. For example, three distinct mutual funds may be created and advertised as a family, with the first fund in the family having a WAM range of 0-180 days, the second fund having a WAM range of 0-120 days, and the third fund having a WAM range of 0-30 days, though any of the funds in the family may have any other WAM range, which may be a range defined using days, months, years, or any other expression of time, and the family of funds may also operate with any other combination of different WAM ranges. Other WAM ranges may be used as described herein.

Although the length of maturity of securities, along with weighted average maturities corresponding to funds, are used herein to describe a differentiation among funds in the family, other values, such as the length of duration of securities and weighted average durations corresponding to funds, may also be used to distinguish each of such funds. For example, the family of funds may be created and advertised such that the weighted average duration corresponding to the security holdings of each fund is ultra short, and each of the funds has a different weighted average duration range than each of the other family funds.

In one embodiment, the NAV corresponding to each of the two or more funds created and advertised is an unrestricted NAV and may fall below (or rise above) the purchase NAV paid by any purchaser when such purchaser purchases shares or creation units of any of the funds in a family.

Select First Fund.

An ETF or mutual fund is selected 218 from any of the two or more ETFs and/or mutual funds in the family, created and advertised as described above with respect to step 216.

If Mutual Fund, Sell/Redeem Shares for Cash.

If the selected fund is a mutual fund 230, then shares of the selected fund are sold and/or redeemed for cash according to the net asset value of the fund 232. In one embodiment, shares of the selected mutual fund are sold by the issuer of such mutual fund for cash (and such shares may also be redeemed from the mutual fund issuer for cash), and the net asset value corresponding to each share of the selected mutual fund may increase or decrease responsive to the value of any assets held by the mutual fund, as well as the number of shares of such mutual fund held by all shareholders. In one embodiment, the price per share, or NAV, received from a shareholder purchasing shares of the selected mutual fund may be less than, more than, or equal to the NAV paid out to such shareholder when the shares are redeemed for cash. In one embodiment, orders corresponding to the purchase or sale of fund shares of the selected mutual fund may be received throughout the day, and any such orders received are processed at step 232 at the close of each trading day using the most recently calculated NAV (described in more detail below) corresponding to the selected fund as the price per fund share.

If ETF, Identify In-Kind Securities/Parameters, Create/5 Redeem Creation Units Using Securities or Cash.

If the selected fund is an ETF 230, then a basket of in-kind securities, including parameters, is identified, and creation units of the selected ETF are created and redeemed using the basket of securities and/or cash 234. In one embodiment, orders to purchase or sell creation units of the selected ETF may be received anytime during the trading day, and/or while the market is closed, and any such orders are processed at the next calculated NAV. However, the shares of each ETF corresponding to such creation units may be traded on a securities exchange throughout the trading day, in a conventional manner.

In one embodiment, the basket of in-kind securities identified for the selected fund specifies the in-kind securities that the ETF provider of the selected ETF will accept in exchange for a creation unit (i.e. block of shares) of the selected ETF. In one embodiment, such basket of in-kind securities also includes parameters, such as the proportions or number of shares of the securities included in the basket of in-kind securities that are accepted by the ETF provider. The in-kind securities specified by the identified basket, in the proportions specified by the corresponding parameters, are received from an authorized participant, which may be a broker-dealer or any other participant authorized to purchase or redeem creation units of the selected ETF, and in exchange for the in-kind securities received, such authorized participant is provided with a creation unit of the selected ETF from which the authorized participant can resell shares of the selected ETF.

When the creation unit of the selected ETF is redeemed, such creation unit of the selected ETF is returned by the authorized participant and redeemed for a basket of in-kind securities, which may include the same securities and proportions as was used to purchase the creation unit, or different securities and/or proportions, as the purchase basket of in-kind securities. Cash may be used instead of some or all of the securities in the basket. In one embodiment, one basket of in-kind securities ("purchase basket") may be specified as the in-kind securities required from an authorized participant wishing to purchase a creation unit of the selected ETF, and a different basket of in-kind securities ("redemption basket") may be specified as the basket of in-kind securities which are provided to the authorized participant when the creation unit is redeemed. In such embodiment, the securities included in the purchase basket and redemption baskets may differ based on the maturity of some or all of the securities or there may be other differences. In one embodiment, the securities included in the purchase basket of in-kind securities corresponding to the selected ETF may be selected based on any current events or anticipated events, such as federal reserve announcements, economic conditions, etc, or any other information.

In one embodiment, a fixed set of securities may be identified as the basket of in-kind securities, or classes of securities may be identified for such basket. If the basket of in-kind securities is a fixed set of securities, then the fixed proportion of each security included in such set (or a cash equivalent) is provided by the authorized participant to receive the creation unit of the selected ETF.

If classes are identified for the basket of in-kind securities, then two or more classes of securities are allocated to such basket of in-kind securities, and two or more securities are specified for each of at least one of the classes of securities, along with parameters for the proportion of securities that are required from each class in order to receive the creation unit of the selected ETF. In one embodiment, classes of securities may be organized based on any number of factors, such as the quality rating of the securities included in each class, the maturity of such securities, and/or any other factors or combination of factors corresponding to the securities included in each class of securities.

In one embodiment, a cash component may additionally be specified as part of the basket of in-kind securities corresponding to the selected ETF, including parameters specifying the amount or proportion of such cash component. In another embodiment, the proportion of the cash component included in the basket of in-kind securities corresponding to the selected ETF may be specified as 100% or the entire basket, such as if creation units of such ETF are sold to, and/or redeemed from, any authorized participant using all cash and no securities.

If Cash Surplus/Deficit, then Buy/Sell Securities to Maintain Weighted Average Maturity Range.

If the purchases and/or redemptions corresponding to the selected fund resulted in a net cash surplus or deficit 236, then securities are purchased and/or sold according to such surplus or deficit cash in a manner which will move the WAM corresponding to the selected fund in a direction that is within an acceptable range, and at least toward an optimal point (i.e. the target WAM) in such range 238. In one embodiment, the optimal point in the WAM range corresponding to the selected fund may be determined based on current or anticipated events, such as those corresponding to federal reserve announcements, economic conditions, etc., as described in more detail below. The method continues at step 240.

Check WAM, Compare to Acceptable Range.

The WAM corresponding to the selected fund is checked and compared to the optimal point in the range identified for such WAM 240.

If the WAM corresponding to the selected fund is within the acceptable WAM range and at its optimal point in such acceptable WAM range 242, then the method continues at step 250.

If WAM is not within Range, Sell and Buy Holdings to Maintain Range.

If the WAM corresponding to the selected fund is not within the acceptable WAM range for such fund, or if the WAM corresponding to the selected fund is not at the optimal point in the acceptable WAM range for such fund 242, then securities included in the selected fund's holdings of securities may be sold and optionally replaced with different securities to put the WAM of the selected fund back within the acceptable WAM range, and/or put the WAM at or closer to its optimal point in such acceptable WAM range, in a manner designed to maximize the after-tax return of the selected fund 244. For example, in one embodiment, if the WAM of the selected fund is determined to be too long for the fund's acceptable WAM range, then securities with longer maturities (and which may also contribute least favorably to the fund's returns) may be sold from the selected fund's holdings and replaced with shorter securities (which also contribute most favorably to the fund's returns). Other factors may be used when deciding which securities to buy and/or sell, such as sector exposure, liquidity, cross transactions, etc. The method continues at step 250.

Determine if Quote Time.

At step 250, a determination is made whether a quote time corresponding to the selected fund has been reached. In one embodiment, a quote time corresponding to the selected mutual fund is any date and time at which current quotation information, including the NAV or dividends corresponding to the selected fund, may be retrieved, such as via a conventional stock exchange. In one embodiment, a quote time for a mutual fund is the end of any trading day for such fund. A quote time for an ETF may be reached at any regular or irregular time interval, such as every fifteen seconds or as frequently as possible, which occurs while the market on which the ETF is listed is operating.

If not Quote Time.

If a quote time corresponding to the selected fund is not reached 252, then the method continues at step 258.

If Quote Time, then Identify Value of Fund's Holdings Via Exchange(S), Identify Quotation for Fund.

If a quote time corresponding to the selected fund is reached 252, then the sum value of all assets included in the selected fund's portfolio is identified via one or more conventional markets and/or exchanges or via a conventional valuation service described below, and a quotation for the NAV corresponding to the selected fund is identified using such identified assets value less any fund liabilities and the total number of shares of the selected fund which are currently outstanding 254. In one embodiment, to identify the NAV quotation corresponding to the selected fund, the value of each of every asset included in the selected fund's holdings of securities is identified via one or more conventional valuation services which value securities based on actual trades or trades of other similar securities. The values of all such assets and any cash balance are summed to identify the total asset value of the selected fund, and then such total asset value identified is divided by the number of shares represented by the selected fund's assets. In one embodiment, any fund liabilities are also identified corresponding to the selected fund and subtracted from the total value of the assets of the selected fund, and then such total asset value minus fund liabilities is divided by the number of fund shares to determine the quotation for the NAV corresponding to the selected fund. Other conventional methods of computing a quotation may also be used.

In one embodiment, the number of shares represented by the selected fund's assets is the total number of shares of the selected fund that are outstanding, if the selected fund is a mutual fund, or it is the total number of outstanding creation units of the selected fund multiplied by the number of shares per creation unit (e.g. 50,000), if the selected fund is an ETF.

Provide Quote to Shareholders and Potential Investors.

The NAV quotation identified for the selected fund is provided 256 to shareholders and potential investors. In one embodiment, the NAV quotation for the selected fund is provided to shareholders and potential investors through one or more exchange quotation servers, at least one of which is also an exchange quotation server to which information about NAV for other funds in the family and returns for at least one other fund is provided. Bid/ask prices for ETF shares may also be provided in a conventional manner by the same or other quotation servers. Each of any exchange quotation servers described herein includes a high transaction volume server capable of handling large numbers of quotations, including processing high volumes of changes to such quotations and requests for such quotations.

In one embodiment, the NAV quotation for the selected fund, if the selected fund is an ETF, is provided to shareholders and potential investors as an intraday quotation value, such as an indicative optimized portfolio value (IOPV) or an intraday indicative value (IIV), approximating the net asset value of the such selected ETF.

If More Funds, then Select Next Fund.

If there are more funds included in the family of funds corresponding to the selected fund to process in the manner described above 258, then the next of such funds is selected from the family of funds 260, and then method continues at step 230 with the newly selected fund. In one embodiment, the family of funds corresponding to the selected fund includes each of the other one or more funds, of the two or more funds described above as part of step 216, which is operated in the same manner as the selected fund and has a different WAM than the selected fund. In one embodiment, all such funds included in the family of funds are managed by the same entity, such as a corporation, which may be the ETF provider of such family of funds, if the selected fund is an ETF, or it may be the mutual fund issuer of such family of funds, if the selected fund is a mutual fund.

If No More Funds, then Wait.

If there are no more funds in the family of funds corresponding to the selected fund to process in the manner described above 258, then the method waits 262 for a short period of time, or for no period of time, and then continues at step 218.

System.

Figure 3:
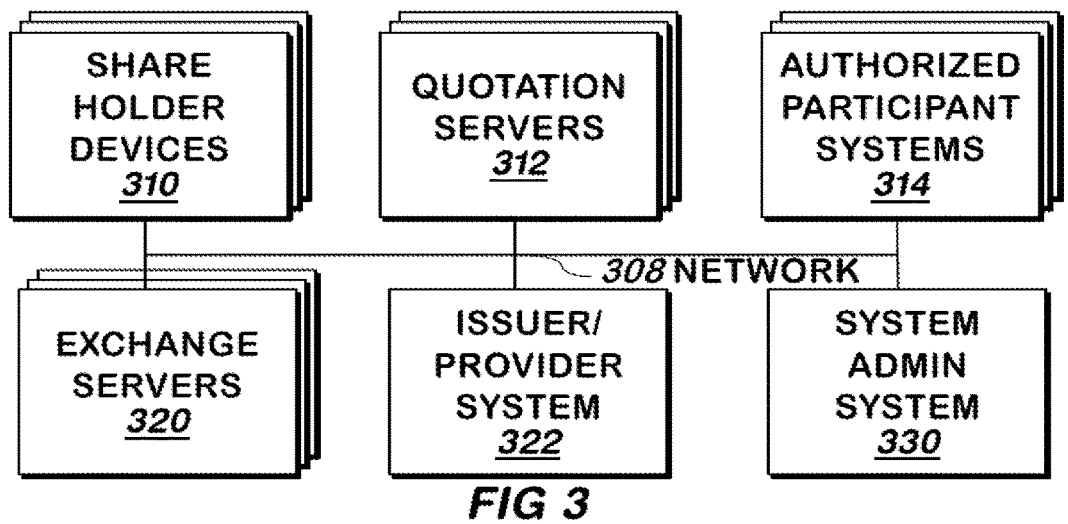
FIG. 3 is a block schematic diagram of a system for operating funds according to one embodiment of the present invention.

FIG. 3 is a block-schematic diagram of a system for creating, advertising, and operating funds according to one embodiment of the present invention.

Figure 4:
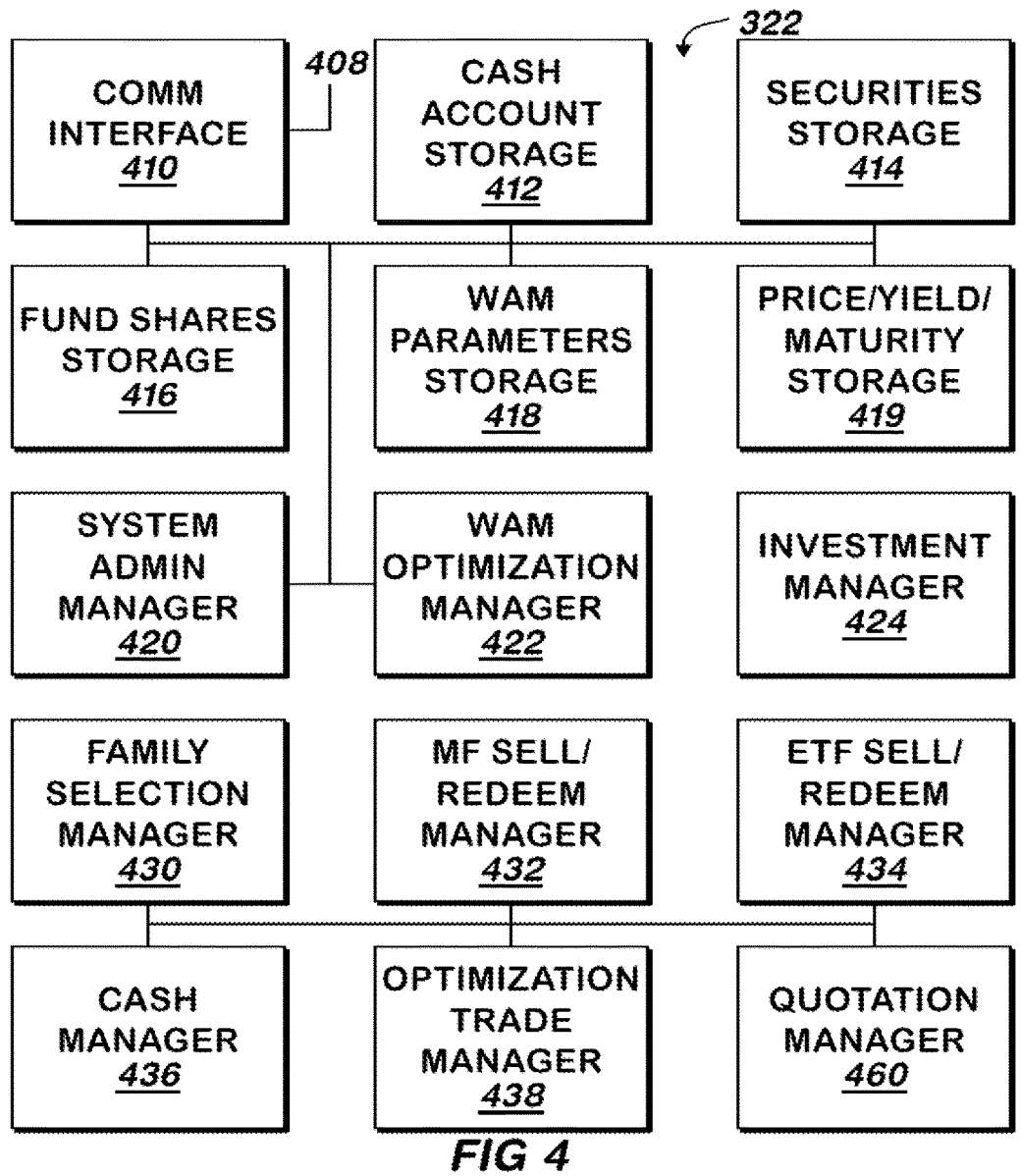
FIG. 4 is a block schematic diagram of an issuer/provider system 322 of FIG. 3 shown in more detail according to one embodiment of the present invention.

FIG. 4 is a block schematic diagram of a representative issuer/provider system 322 of FIG. 3 shown in more detail according to one embodiment of the present invention.

The system may be implemented via one or more hardware processors, operating as described herein and below. The processors may be under software or firmware control.

Referring now to FIGS. 3 and 4, the system of FIG. 3 contains any number of shareholder devices 310, quotation servers 312, authorized participant systems 314, exchange system 320, an issuer/provider system 322, and a system administrator system 330, though other arrangements may be used. Each of these may include conventional computer systems or server computer systems.

Issuer/provider system 322 includes a server including a communication interface 410, which may include a conventional communication interface running suitable communication protocols, such as Ethernet, TCP/IP or both. In one embodiment, unless otherwise noted herein, all communication in and out of issuer/provider system 322 are via input/output 408 of its communication interface 410. Each of systems 310, 312, 314, 320, 322 and 330 may also be coupled to network 308 via each systems respective communication interface (not shown), which may be similar to communication interface 410 of issuer/provider system 322.

Shareholder device 310 may include a conventional computer system or mobile device and may be used, such as by shareholders, potential investors, advisors and other similar parties of any mutual fund or ETF, to review quotation, yield and NAV information from quotation servers 312 and trade shares of such fund or funds as described herein via exchange servers 310. In one embodiment, investors, using shareholder device 310, obtain quotations information, yield information, or any other information corresponding to any funds from quotation servers 312, as described above, and such information is used for analysis as well as for buying and selling fund shares.

Quotation server 312, which may include a conventional securities quotation server adapted to handle high transaction volumes of quotations, as described above, receives information regarding quotations and/or yield, for example, from exchange servers 320 and provides quotation and yield information for each fund in the family of funds and other conventional funds and/or securities to shareholder device 310. Quotation servers 312 may include servers of conventional valuation services which provide estimates of value as "quotations".

Issuer/provider system 322 may include a conventional computer system and is programmed to operate a family of ETFs or mutual funds as described in more detail below.

Exchange servers 320 may include a conventional securities exchange server adapted to handle high transaction volume to allow users to purchase, sell, or otherwise exchange securities and/or cash, or perform any other conventional transactions corresponding to securities. Conventional bid and ask information may be received for ETFs such as those described herein and used to provide bid and ask quotation information to quotation servers 312.

Authorized participant system 314 may include any conventional computer system used to trade ETF creation units via issuer/provider system 322 and ETF shares via exchange servers 320 as described above.

System administrator system 330 may include a conventional computer system to be used by a system administrator, such as a fund manager or other system administrator, as described above and in more detail below.

All systems and some or all elements of FIGS. 3 and 4 operate via one or more hardware processors as described herein and communicate via network 308, which may include one or more conventional Ethernet networks, the Internet, or both.

In one embodiment, issuer provider system 322 is programmed to create and advertise, as described above, as well as operate in the manner described above and in more detail below, a family of two or more funds, which may be two or more Exchange-Traded Funds or two or more mutual funds. As described herein, each of the two or more funds in the family holds financial instruments which average to an ultra short weighted maturity (or duration) length and are high credit quality rated. Each fund in the family is operated with a different weighted average maturity (WAM) range from any other of the funds in the same family of two or more funds as described herein.

As noted above, maturity lengths corresponding to securities and weighted average maturity lengths corresponding to each of the family funds are used herein to describe a means of differentiating among the funds in the family; however, other values, such as durations corresponding to securities and weighted average durations corresponding to each of the funds, may also be used, or used instead, to distinguish each of such funds.

In one embodiment, securities used in any family of funds are taxable fixed income securities, such as taxable bonds. Other embodiments include tax-advantaged or tax free securities such as treasury securities and/or municipal securities for a given fund or for all funds in the same family. In one embodiment, funds in a family may have identical WAM ranges or different WAM ranges, but invest in different asset classes as described above.

In one embodiment, system administration manager 420 of issuer/provider system 322 receives from a system administrator (e.g. a fund manager), information about a family of two or more funds, including a fund identifier corresponding to each of the two or more funds, and a WAM maximum and WAM minimum corresponding to each of the two or more funds. In one embodiment, the family of two or more funds may be a family of two or more mutual funds or two or more Exchange-Traded Funds (ETFs), as described above, and the maximum WAM and minimum WAM corresponding to each fund are the upper and lower bounds defining an acceptable WAM range corresponding to each fund. In one embodiment, the minimum WAM is zero and such minimum WAM need not be received. In one embodiment, the WAM corresponding to a family fund is the weighted average maturity calculated for the holdings of such fund when the maturity corresponding to each security holding is weighted by the amount, in dollars, of such security that are held in the fund holdings, as described above. For example, if the holdings of a very simplified Example Fund include a $60 investment in Security A with a maturity of 20 days, and a $20 investment in Security B which has a maturity of 5 days, then the average weighted maturity of the holdings of such fund is calculated as 16.25 days. In one embodiment, the acceptable WAM range, defined by the WAM maximum and WAM minimum, received corresponding to each fund identifier is different than every other WAM range received corresponding to any other fund identifier received, as described above.

System administration manager 420 stores each of the two or more fund identifiers received corresponding to the family of funds in WAM parameters storage 418, each associated with the corresponding WAM maximum and WAM minimum received for that fund. In one embodiment, system administration manager 420 also stores each of the received fund identifiers in cash account storage 412, securities storage 414, and fund shares storage 416.

In one embodiment, system administration manager 420 also receives from the system administrator (e.g. fund manager) a list of initial securities holdings, if any, corresponding to each of the fund identifiers received, which system administration manager 420 stores in securities storage 414. In one embodiment, the list of initial securities holdings corresponding to a fund includes any number of security identifiers which each correspond to a security (e.g. stocks, bonds, or any other financial instruments, as described above) held by the fund, each security identifier with its corresponding price, credit quality rating, yield, and maturity, as well as the number of shares or other quantity of each security that are held in the fund, as described above.

System administration manager 420 additionally receives any number of family fund attributes, securities evaluation formulas, and financial climate events from the system administrator. Such information may be received for each fund in the family and/or for all funds in the family. When information is received for each fund, it is received, and optionally stored, with an identifier of the fund to which it corresponds.

In one embodiment, family fund attributes include any number of characteristic requirements corresponding to security holdings included in any of the family funds. A family fund is a fund in a family. There may be any number of families. In one embodiment, all securities included in, or added to, the holdings of any family fund will meet the requirements described by the family fund attributes, as described above. In one embodiment, family fund attributes may include a maturity of twelve months or less, a single A-credit quality rating or above, and any other characteristic requirements, as described above. Other embodiments allow differences of such attributes or characteristics between funds in a family.

Securities evaluation formulas include any formulas or processes which may be used to evaluate and/or select securities to be added to, or removed from, the holdings of any fund included in the family of funds. In one embodiment, securities evaluation formulas may be formulas used to calculate and/or evaluate a risk-adjusted yield for securities with different credit quality ratings. The risk-adjusted yield of securities may be used, as described in more detail below, to compare securities with different credit quality ratings and/or determine which securities, if any, to purchase, sell, or replace from the securities holdings of a family fund. In general, among securities which have similar credit quality ratings and maturity dates, the securities that offer the most favorable yield are calculated to have the highest risk-adjusted yield; or, if the yield offered by securities are identical and the credit quality rating varies from "A" to "AA" to "AAA", then the securities with the most favorable credit quality ratings are calculated to have the highest risk-adjusted yield, and such securities with the highest risk-adjusted yield and also a maturity which adjusts the WAM of a fund toward its optimal place (i.e. the target WAM), as described in more detail below, may be selected as securities to add to a fund's holdings over other securities with a lower risk-adjusted yield or a maturity which does not adjust the WAM of the fund toward its optimal place; or, if the yield offered for a security is very high relative to its risk (e.g. above a threshold yield and/or threshold risk-adjusted yield), then such a security may be added to a fund's holdings even if its maturity does not adjust the WAM of the fund toward its optimal place. Securities evaluation formulas and the use of such securities evaluation formulas are additionally described in more detail below.

In one embodiment, a financial climate event, including an event date and a predicted impact on interest rates, may be any event that is expected or predicted to occur at a future date, which may affect any current quotations, rates, or yields; and/or any future quotations, rates, or yields, such as the current or future price for any securities, current or future interest rates, or any other current or future aspects of the financial climate or of any financial markets. In one embodiment, the predicted impact on interest rates or yields corresponding to a financial climate event may be received as one expected to cause higher interest rates or yields, much higher interest rates or yields, lower interest rates or yields, or much lower interest rates or yields. An example of a financial climate event is an expected meeting of, and/or announcement from, the Federal Reserve. If the Federal Reserve is expected to hold a meeting on April 1 and potentially make an announcement to raise federal interest rates on such date, then the event date, April 1, and the predicted impact of higher federal interest rates corresponding to such event date, may be received by system administration manager 420 as a financial climate event.

In one embodiment, system administration manager 420 may also receive (or retrieve) current quotations information from quotation servers 312, as described herein. In one embodiment, current quotations information is information that may be used to make any decisions, such as future-dependent decisions, regarding the securities holdings of fund shares of any fund included in the family of funds described herein. Such information may include conventional quotation information including prices, rates, yields, or other similar information, as well as current federal fund rates or interest rates, current inter-bank lending rates, current interest rates on Treasury Inflation Protected Securities Funds (TIPS), and/or any other current rates for future-dependent securities or markets.

System administration manager 420 may receive and/or retrieve family fund attributes, security evaluation formulas, financial climate events, and current quotations information at any time, and also receive and/or retrieve any changes or updates to such information at any time, and system administration manager 420 stores any such family fund attributes, security evaluation formulas, financial climate events, and current quotations information received and/or retrieved in WAM parameters storage 412 along with the date and time that the information is received or retrieved, and for information corresponding to a specific one or more fund, along with the identifier or identifiers, if any, of the fund or funds to which such information corresponds. In one embodiment, system administration manager 420 may receive such information described herein from one system administrator (e.g. fund manager) at issuer/provider system 322, or it may receive the information from more than one such administrator.

In one embodiment, when system administration manager 420 stores such information in WAM parameters storage 418, and in one embodiment, when it receives and stores updates to such information (e.g. new financial climate events, or new current quotations information, etc.), system administration manager 420 signals WAM optimization manager 422 to calculate the target WAM corresponding to the fund or funds in the family corresponding to such received information in WAM parameters storage 418, or recalculate the target WAM for any or all of such funds, as described above and in more detail below.

At least once a day, investment manager 424 retrieves securities information from quotation servers 312 and identifies and stores a list of available, permissible securities in price/yield/maturity storage 419 along with the date and time when such list is stored. In one embodiment, the list of available, permissible securities information includes any number of securities available for trading via exchange servers 320, which are additionally permissible to be added to the holdings of a family fund based on family fund attributes of securities holdings of any family fund, as described above. Investment manager 424 identifies permissible securities from the available securities retrieved from quotation servers 312 using the family fund attributes in WAM parameters storage 418 (or receives a list of them from the system administrator via system administration manager 420), and stores a security identifier, price, rating, maturity, and yield in price/yield/maturity storage 419 corresponding to each such available, permissible security identified.

WAM optimization manager 422 receives the signal from system administration manager 420 and identifies target WAMs corresponding to each of the fund identifiers in WAM parameters storage 418. To identify the target WAM corresponding to a fund identifier as described above, WAM optimization manager 422 identifies the acceptable WAM range corresponding to such fund identifier in WAM parameters storage 418, and WAM optimization manager 422 also identifies any financial climate events in WAM parameters storage 418 which are applicable to the acceptable WAM range identified and, optionally, which are not already priced in to the market and the current price for securities, as described above and in more detail below.

In one embodiment, WAM optimization manager 422 identifies the financial climate events applicable to the acceptable WAM range corresponding to the fund identifier in WAM parameters storage 418, and WAM optimization manager 422 may use any current quotations information in WAM parameters storage 418 and/or any prices, ratings, yields, and maturities information in price/yield/maturity storage 419 to identify financial climate events in WAM parameters storage 418 for which the predicted interest rate impact is not already priced in to current market prices. In one embodiment, WAM optimization manager 422 makes a determination whether the predicted impact on interest rates corresponding to any financial climate event for which the event date is within (or is within a threshold amount of time from) the acceptable WAM range of a fund is a predicted impact that has been priced in to the price of securities, or any other current quotations and/or rates information, at a date prior to the event date corresponding to such financial climate event. For example, if inflation is predicted to rise due to a financial climate event received and stored as described above, causing much higher interest rates in the future, and if WAM optimization manager 422 determines that interest rates or yields for maturities before and after such financial climate event are different in the manner corresponding to such event (e.g. much higher for maturities after the date of an event for which interest rates are expected to rise) received according to current quotations information in WAM parameters storage 418, then WAM optimization manager 422 determines that the predicted impact on interest rates associated with such financial climate event has already been priced into the current prices of securities; and therefore, such financial climate event is not identified as one for which the predicted impact has not be priced in to current market prices.

In one embodiment, WAM optimization manager 422 identifies the target WAM corresponding to each family fund, as described above and in more detail below, using any financial climate events applicable to the acceptable WAM range corresponding to the fund and for which the predicted impact on interest rates has not already been priced in to the current price of securities. The target WAM for a fund is identified so that the WAM is between the minimum WAM and maximum WAM for that fund to maximize the return based on financial climate events that have not already been priced into the market, for example, extending the target WAM past a financial climate event for which interest rates are expected to fall. WAM optimization manager 422 stores each target WAM identified in WAM parameters storage 418 associated with the date and time when such target WAM is identified and the fund identifier for which the target WAM is identified.

Conventional trading and processing times for ETFs and/or mutual funds are used to receive and process trades for funds in the family. Trades may be accepted at any time or at certain times, and they may be processed at one time or at different times. For example, trades in a mutual fund may be received at any time, and those received before the close of market trading may be processed after the next such close in a conventional manner. Trades in an ETF may be received at any time and processed after the next quotation. Other times may be used. The times during which trades are processed may be broken into one or more trade processing periods and trades may be processed at the end of the period.

In the embodiments in which the funds in the family of finds are ETFS, at the start of a trade processing period for each of the funds included in the family of funds in WAM parameters storage 418, family selection manager 430 selects the first fund from the family of funds. In one embodiment, a trade processing period for funds in a family of ETFs starts at the opening of the securities market or markets in which the security holdings of the family funds are traded. In one embodiment, family selection manager 430 selects the fund identifier corresponding to the first fund in WAM parameters storage 418.

If the family of funds in WAM parameters storage 418 is a family of mutual funds, family selection manager 430 provides the selected fund identifier to mutual fund sell/redeem manager 432. Mutual fund sell/redeem manager 432 receives the selected fund identifier from family selection manager 430, and mutual fund sell/redeem manager 432 processes any number of fund shares orders, which it may have received at any time since the market last opened and stored internally, corresponding to the received fund identifier. In one embodiment, mutual fund sell/redeem manager 432 sells or redeems fund shares corresponding to the received fund identifier in a conventional manner as described above, updates a fund shares log associated with the received fund identifier in fund shares storage 416, and updates a cash balance log associated with the received fund identifier in cash account storage 412.

To maintain the fund shares log associated with the selected fund identifier in fund share storage 416 for each purchase or redemption, mutual fund sell/redeem manager 432 generates and stores a unique transaction serial number in the fund shares log associated with the received fund identifier in fund shares storage 416, along with the number of fund shares of the selected fund that have been sold or redeemed, an indication whether such fund shares were sold or redeemed, a shareholder identifier corresponding to the shareholder to whom, or from whom, the shares were sold or redeemed, and the date and time when the fund shares were sold or redeemed. In one embodiment, mutual fund sell/redeem manager 432 may also keep a running total of the number of fund shares of the selected fund that are owned by all shareholders of such fund at the date and time when it processes the fund shares transaction as described above.

To update the cash balance log associated with the received fund identifier in cash account storage 412, mutual fund sell/redeem manager 432 stores the amount of cash it received or paid out in exchange for such fund shares in the cash balance log corresponding to the received fund identifier in cash account storage 412. In one embodiment, mutual fund sell/redeem manager 432 stores any amount of cash received from shareholders, when fund shares are sold, as a positive amount or cash excess in cash account storage 412, and stores any amount of cash paid out to shareholders, when fund shares are redeemed, as a negative amount or cash deficit.

In one embodiment, mutual fund sell/redeem manager 432 signals cash manager 436 with fund identifier corresponding to the selected fund.

If the family of funds are ETFs, ETF sell/redeem manager 434 receives the fund identifier corresponding to the selected fund from family fund selection manager 430 as described above, and ETF sell/redeem manager 434 processes the creation and/or redemption of creation units of the selected fund, which it performs in a manner conventional to ETFs, as described above, with requests for such creations and/or redemptions having been received by ETF sell/redeem manager 434 since the prior end of trading day. In one embodiment, ETF sell/redeem manager 434 identifies in-kind securities corresponding to the selected fund identifier in securities storage 414, which may include a fixed basket of in-kind securities, or it may include two or more classes of securities and corresponding parameters, as described above, and ETF sell/redeem manager 434 receives or provides appropriate securities in exchange for creation units of the selected ETF as described above. In one embodiment, a fixed basket of in-kind securities includes two or more security identifiers, each with a corresponding proportion and/or number of shares. A basket of two or more classes of securities may include two or more security class identifiers, each associated with a subset of two or more security identifiers, and corresponding proportions for the amount of securities from each class of securities that may be traded for creation units as described above.

In one embodiment, as ETF sell/redeem manager 434 creates and/or redeems creation units of the selected fund in a conventional manner as described above, it updates a creation units log associated with the received fund identifier in fund shares storage 416, and updates the fund holdings information associated with the received fund identifier in securities storage 412. In one embodiment, ETF sell/redeem manager 434 may also update a cash balance log associated with the received fund identifier in cash account storage 412 as described below.

In one embodiment, ETF sell/redeem manager 434 updates the creation units log associated with the received fund identifier in securities storage 412 in a manner similar to the manner described above in which mutual fund sell/redeem manager 432 stores fund shares transaction information in fund shares storage 416. In one embodiment, ETF sell/redeem manager 434 generates and stores a unique transaction serial number for the transaction in fund shares storage 414, along with the number of creation units created or redeemed and an indication of whether the creation units are created or redeemed, a participant identifier corresponding to the authorized participant to or from which such creation units are sold or redeemed, and the date and time when the creation units are sold or redeemed. In one embodiment, ETF sell/redeem manager 434 may store the number of creation units sold or redeemed in fund shares storage 416, or ETF sell/redeem manager 434 may store the number of shares (i.e. the number of creation units multiplied by the number of shares included in each creation unit) sold or redeemed in fund shares storage 416. In one embodiment, ETF sell/redeem manager 434 may keep a running total in fund shares storage 416 of the total number of creation units (or ETF shares) corresponding to the received fund identifier that are owned by authorized participants at the current date and time.

To update the fund holdings information corresponding to the received fund identifier in securities storage 414, ETF sell/redeem manager 434 stores the number of shares of each security that it received or provided in exchange for creation units corresponding to the received fund identifier in securities storage 414, along with an indication whether such security shares were received or provided, and the date and time when such security shares were received or provided.

In one embodiment, such as if the in-kind securities corresponding to the received fund identifier includes a cash component as described above, ETF sell/redeem manager 434 additionally updates the cash balance log associated with the received fund identifier in cash account storage 412 by storing the amount of cash it received or paid out in such cash balance in a manner similar to the manner described above in which mutual fund sell/redeem manager 432 stores the amount of cash received or paid out corresponding to the trading of mutual fund shares in cash account storage 412.

In one embodiment, ETF sell/redeem manager 434 may signal cash manager 436 with the received fund identifier if cash was received.

Cash manager 436 receives the signal and selected fund identifier from mutual fund sell/redeem manager 432, or from ETF sell/redeem manager 434, and cash manager 436 checks the cash balance log associated with the received fund identifier in cash account storage 412 to determine if an excess or deficit cash balance is recorded, as described above. If cash manager 436 identifies an excess or deficit cash balance in the cash balance log in cash account storage 412 corresponding to the received fund identifier, then cash manager 436 may adjust the excess or deficit cash balance log corresponding to such fund identifier to balance such excess or deficit (i.e. bring the cash balance closer to zero) by purchasing or selling securities as described above and in more detail below. In one embodiment, cash manager 436 may also check, monitor, and/or adjust the cash balance log in cash account storage 412 associated with the selected fund identifier at any time.

If cash manager 436 identifies an excess, or positive, cash balance (i.e. too much cash) corresponding to the received fund identifier in cash account storage 416 (e.g. above a threshold excess amount), then cash manager 436 identifies securities to add to the fund holdings of the selected fund ("cash purchase securities"), which are equivalent, or nearly equivalent, to the excess cash balance identified, and which contribute favorably to the WAM of the selected fund while maximizing the return of the selected fund, as described above. In one embodiment, cash manager 436 identifies any cash purchase securities from the list of available, permissible securities in price/yield/maturity storage 419.

To determine which available permissible securities contribute favorably to the WAM of the selected fund, cash manager 436 identifies the WAM corresponding to the selected fund and the target WAM corresponding to the selected fund, and then cash manager 436 identifies which available, permissible securities in price/yield/maturity storage 419 may be added to the selected fund's holdings 414 to place or maintain the WAM of selected fund within its acceptable WAM range, and also adjust such WAM toward the target WAM corresponding to the selected fund. In one embodiment, cash manager 436 identifies securities holdings in securities storage 414 associated with the received fund identifier, including the dollar amount of each such security holding and the maturity of each such security holding, and cash manager 436 calculates the WAM corresponding to the selected fund using such information as described above. In one embodiment, cash manager 436 identifies the acceptable WAM range and target WAM corresponding to the selected fund in WAM parameters storage 419 associated with the received fund identifier.

To identify the cash purchase securities from the available, permissible securities identified as contributing favorably to the WAM of the selected fund, cash manager 436 evaluates the price, credit quality rating, and yield corresponding to each of the available, permissible securities using the security evaluation formulas in WAM parameters storage 418. In one embodiment, cash manager 436 calculates a risk-adjusted yield corresponding to each of any available, permissible securities in price/yield/maturity storage 419, and cash manager 436 ranks the securities included in the list of available, permissible securities by risk-adjusted yield, with securities having the highest value for their risk-adjusted yield ranked more highly than securities having a lower value for the risk-adjusted yield. Cash manager 436 may store such values for risk-adjusted yield, as well as any securities ranking information, in price/yield/maturity storage 419, or cash manager 436 may store or keep track of them internally.

Cash manager 436 identifies cash purchase securities corresponding to the received fund identifier (i.e. the securities to add to the holdings of the selected fund) as the available, permissible securities in price/yield/maturity storage 419 which have been identified as contributing favorably to the WAM of the selected fund (i.e. that move it closer to the target WAM of that fund), and for which the risk-adjusted yield calculated is the highest. Other factors may be used to identify the purchase or sale of securities as described herein.

Correspondingly, if cash manager 436 identifies a deficit cash balance in the cash balance log associated with the received fund identifier in cash account storage 412, then cash manager 436 chooses cash sell securities from the securities holdings associated with the received fund identifier in securities storage 414 to sell, in an amount equivalent or nearly equivalent to the cash deficit balance identified, in order to optimize the WAM of the selected fund as described above and also maximize the yield of the selected fund. In one embodiment, cash manager 436 identifies security holdings in securities storage 414, associated with the received fund identifier, which contribute unfavorably to the target WAM of the selected fund (i.e. those that have a maturity among the furthest from the target WAM), identified in WAM parameters storage 418, and cash manager 426 also evaluates a risk-adjusted yield for each of such identified securities holdings in securities storage 414 using the security evaluation formulas in WAM parameters storage 418. In one embodiment, cash manager 436 ranks such security holdings according to such values calculated for risk-adjusted yield, and cash manager 436 identifies cash sell securities as those security holdings associated with the least favorable yield, or least favorable risk-adjusted yield, and that contribute least favorably to adjusting the WAM of the security holdings toward the target WAM corresponding to the received fund identifier in WAM parameters storage 418.

In one embodiment, cash manager 436 purchases or sells, or causes to be purchased or sold, any cash purchase or cash sell securities it has identified corresponding to the received fund identifier via exchange servers 320 in a conventional manner of trading securities, as described above. Cash manager 436 updates the cash balance log in cash account storage 412 associated with the received fund identifier with the new cash balance remaining after the identified cash purchase or cash sell securities have been purchased or sold. In one embodiment, cash manager 436 may also store a transaction record in cash account storage 412, including a transaction serial number it generates, the amount of cash paid out to purchase, or received to sell, the cash purchase/cash sell securities, including the price received or paid for the securities as well as any commission fees and/or taxes for the securities transaction, and the date and time when such cash was received paid out.

Cash manager 436 adds any securities purchased to, or removes any securities holdings sold from, the securities holdings in securities storage 414 associated with the received fund identifier, along with a record of such securities transaction including the transaction serial number it stored in cash account storage 412, a security identifier for each specific security added or removed, and the amount (or amounts) of shares of each added or removed security. In one embodiment, for any securities added to the securities holdings of the selected fund, cash manager 436 stores the price, credit quality rating, yield, maturity, and any historical returns information corresponding to such security, as well as any other attributes or information corresponding to the security, in securities storage 414 associated with the received fund identifier.

When cash manager 436 has checked, and optionally adjusted, the cash balance log corresponding to the selected fund in cash account storage 416 as described herein, cash manager 436 signals optimization trade manager 438 with the selected fund identifier.

Optimization trade manager 438 receives the signal and the fund identifier corresponding to the selected fund from cash manager 436, and optimization trade manager 438 determines if the WAM of the selected fund and/or the risk-adjusted yield of securities holdings of the selected fund may be optimized, or further optimized, by replacing any securities holdings of the selected fund with replacement securities, as described above.

In one embodiment, optimization trade manager 438 calculates the WAM of the selected fund, as described above, using the investment amounts (price multiplied by number of shares held) corresponding to each of any securities holdings associated with the received fund identifier corresponding to the selected fund in security storage 414, and the corresponding maturities of each of such holdings.

Optimization trade manager 438 compares the WAM calculated for securities holdings of the selected fund to WAM parameters associated with the selected fund in WAM parameters storage 418 in the same manner as that described above. In one embodiment, optimization trade manager 438 identifies WAM parameters corresponding to the received fund identifier in WAM parameters storage 418, including the WAM maximum, WAM minimum, and target WAM for the selected fund, and optimization trade manager 438 compares the WAM it calculated for the securities holdings associated with the received fund identifier in securities storage 414 with such WAM parameters that it identifies in WAM parameters storage 418. In one embodiment, optimization trade manager 438 determines if the WAM calculated corresponding to the selected fund's securities holdings is included in the acceptable WAM range associated with the received fund identifier in WAM parameters storage 418 (i.e. WAM is longer than the WAM minimum and shorter than the WAM maximum), and also determines if such WAM calculated for the selected fund's holdings matches, or nearly matches, the target WAM associated with the received fund identifier in WAM parameters storage 418.

In one embodiment, optimization trade manager 438 additionally uses the security evaluation formulas in WAM parameters storage 418 to calculate a risk-adjusted yield, as described above, for each of any securities holdings associated with the received fund identifier in securities storage 414, and also for each of any available, permissible securities in price/yield/maturity storage 419. In one embodiment, optimization trade manager 438 compares the risk-adjusted yield for securities holdings of the selected fund with the risk-adjusted yield for available, permissible securities.

If optimization trade manager 438 determines that the WAM calculated for the security holdings corresponding to the received fund identifier in securities storage 414 matches or nearly matches the target WAM corresponding to such fund, and also determines that the risk-adjusted yield corresponding to the securities holdings of the selected fund are optimized as described above, then optimization trade manager 438 signals quotation manager 460 with the fund identifier corresponding to the selected fund.

Otherwise, optimization trade manager 438 may sell any securities holdings associated with the received fund identifier in securities storage 414 and replace them with replacement securities, as described above. In one embodiment, optimization trade manager 438 sells securities holdings having a maturity that contributes least favorably to the WAM of the fund maturities and/or having a risk-adjusted yield that contributes least favorably to the overall risk-adjusted yield of the selected fund, and optimization trade manager 438 may purchase as replacement securities any of the available, permissible securities in price/yield/maturity storage 419 which contribute to a more optimal weighted average maturity and/or more optimal risk-adjusted yield than the securities holdings that it sells, as described above. Trade offs between these two issues may be resolved per the securities evaluation formulas stored in WAM parameters storage 412 for making such tradeoffs. In one embodiment, optimization trade manager 438 may also determine whether to replace securities or not replace securities, as described above, based on any additional commission fees that may be required to sell securities holdings and/or purchase replacement securities, as well as based on any additional taxes that may be owed when securities are sold at a loss (e.g. such sales, and any other purchases/sales which minimize the amount of any taxes owed corresponding to the transaction, may be favored) or when securities are sold for a gain (e.g. such sales, and any other securities transactions corresponding to which additional taxes may be owed, are disfavored). Optimization trade manager 438 signals quotation manager 460 with the selected fund identifier.

Quotation manager 460 receives the signal and selected fund identifier from optimization trade manager 438, and quotation manager 460 makes a determination whether the current time is a quotation time corresponding to the received fund identifier. In one embodiment, a quotation time for a mutual fund may be identified if the trading day on the securities market trading the fund has just closed, as described above, and a quotation time for any ETF may be identified at any time during which the securities market is open and immediately after close. Quotation manager 460 may use an internal clock, or a system clock, or any other timing device to determine whether the current time is a quotation time corresponding to the received fund identifier. Another time or times may be used to provide quotations, such as any conventional time that mutual fund quotations are provided.

If quotation manager 460 determines that the current time is a quotation time corresponding to the selected fund identifier, then quotation manager 460 identifies a total asset value of the securities holdings of the selected fund. In one embodiment, quotation manager 460 identifies a corresponding number of shares held of each securities holding associated with the received fund identifier in securities storage 414 and obtains a quotation or estimate of the value of each such security from one or more quotation servers 312 to determine the total asset value corresponding to the selected fund. Quotation manager 460 calculates a quotation for the net asset value (NAV) corresponding to the selected fund using such total asset value calculated, along with the number of fund shares of the selected fund that are available for trading, which quotation manager 460 identifies as the number of fund shares associated with the received fund identifier that are sold in fund shares storage 416.

In one embodiment, quotation servers 312 also supply bid and ask prices or yields for shares of the funds in the family, and such shares of such funds may be traded via conventional exchange servers 320, for example, if the funds in the family are exchange traded funds, in each case, using conventional techniques.

In one embodiment, if the selected fund is an ETF, quotation manager 460 calculates the total asset value of securities held corresponding to the selected fund in securities storage 414, and calculates an intraday quotation (e.g. indicative optimized portfolio value (IOPV) or an intraday indicative value (IIV)) which approximates the NAV corresponding to the selected fund using such total asset value calculated and the number of creation units that are distributed of the selected ETF fund shares storage 416. The portion of quotation manager 460 that performs such calculation may reside on quotation server 312 in one embodiment, and provide the quotation to the portion residing in issuer/provider system 322 upon receipt of the holdings of the fund, number of shares, and fund liabilities from the portion of quotation manager 460 residing in issuer/provider system.

Quotation manager 460 (or either portion of it described above) provides the calculated quotation for the NAV of the selected fund to shareholders and potential investors of the selected fund via quotation server 312, which may include a conventional securities quotation server adapted to handle high transaction volume as described above.

When quotation manager 460 has provided the quotation it calculates for the selected fund to quotation servers 312, or if quotation manager 460 has determined that it is not a quotation time for the selected fund as described above, then quotation manager 460 provides the received fund identifier corresponding to the selected fund to family fund selection manager 430 along with a signal to select the next fund in the family.

Family fund selection manager 430 receives the signal and fund identifier from quotation manager 460, and family fund selection manager 430 determines if any other funds in the family of funds are to be processed in the manner described herein. If family fund selection manager 430 determines that any such funds exist, then family selection manager 430 selects the next of such funds and repeats the process using the newly selected fund. In one embodiment, family fund selection manager 430 provides the fund identifier corresponding to the newly selected fund to mutual fund sell/redeem manager 432 or ETF sell/redeem manager 434 as described above.

In one embodiment, if family fund selection manager 430 determines that no other funds are to be processed in the manner described herein, then family selection manager 430 may wait for a short period of time, or for no period of time, as described above, and then select the first fund from the family of funds as described above, and repeat the process using the newly selected fund.

SUMMARY

There has been shown a method of operating a plurality of funds including a first fund and a second fund, the method including the steps of: identifying a first set of at least one security that should be sold from the first fund, and a second set of at least one security that should be purchased for the first fund, so as to cause a weighted average maturity of the first fund to fall within a first range of weighted average maturities advertised to purchasers of the shares of the first fund and to purchasers of shares of the second fund; identifying a third set of securities that should be sold from the second fund and a fourth set of securities that should be purchased for the second fund so as to cause a weighted average maturity of the second fund to fall within a second range of weighted average maturities advertised to purchasers of the first fund and to purchasers of the second fund, the second range being different from the first range; trading the first set of securities and second set of securities using the first fund; and trading the third set of securities and fourth set of securities using the second fund.

The method includes an optional feature whereby the second range is comprises a range of weighted average maturities that are greater than, and entirely outside of, the first range of weighted average maturities.

The method includes an optional feature whereby the second range is adjacent to the first range, and overlaps by no more than one day.

The method may additionally include the steps of identifying a fifth set of at least one security that should be sold from a third fund, and a sixth set of at least one security that should be purchased for the third fund, so as to cause a weighted average maturity of the third fund to fall within a third range of weighted average maturities advertised to purchasers of the shares of the first fund and to purchasers of shares of the second fund and to purchasers of the third fund; and trading the fifth set of securities and sixth set of securities using the third fund, and includes an optional feature whereby the third range is adjacent to the second range, and overlaps by no more than one day.

The method includes an optional feature whereby wherein the second range is not adjacent to the first range.

The method includes an optional feature whereby a first portion of the second range of weighted average maturities is greater than any of the weighted average maturities in the first range, and a second portion of the second range of weighted average maturities is within the first range of weighted average maturities, the second portion comprising a plurality of days. There has been disclosed a system for operating a plurality of funds including a first fund and a second fund, the system including a family fund selection manager for selecting and providing at an output an identifier of the first fund or the second fund; and an optimization trade manager having an input coupled to the family fund selection manager for receiving the identifier of the first fund or the second fund, the optimization trade manager for: responsive to the identifier received at the optimization trade manager input comprising the identifier of the first fund, identifying a first set of at least one security that should be sold from the first fund, and a second set of at least one security that should be purchased for the first fund, so as to cause a weighted average maturity of the first fund to fall within a first range of weighted average maturities advertised to purchasers of the shares of the first fund and to purchasers of shares of the second fund, and trading via an input/output, the first set of securities and second set of securities using the first fund; and responsive to the identifier received at the optimization trade manager input comprising the identifier of the second fund, identifying a third set of securities that should be sold from the second fund and a fourth set of securities that should be purchased for the second fund so as to cause a weighted average maturity of the second fund to fall within a second range of weighted average maturities advertised to purchasers of the first fund and to purchasers of the second fund, the second range being different from the first range, and trading via the optimization trade manager input/output, the third set of securities and fourth set of securities using the second fund.

The system includes an optional feature whereby the second range is comprises a range of weighted average maturities that are greater than, and entirely outside of, the first range of weighted average maturities.

The system includes an optional feature whereby the second range is adjacent to the first range, and overlaps by no more than one day.

The system includes an optional feature whereby the family fund selection manager selects and provides at the family fund selection manager output an identifier of the first fund or the second fund or a third fund, the optimization trade manager is additionally for, responsive to the identifier received at the optimization trade manager input comprising the identifier of the first fund, identifying a fifth set of at least one security that should be sold from a third fund, and a sixth set of at least one security that should be purchased for the third fund, so as to cause a weighted average maturity of the third fund to fall within a third range of weighted average maturities advertised to purchasers of the shares of the first fund and to purchasers of shares of the second fund and to purchasers of the third fund and for trading, via the optimization trade manager input/output, the fifth set of securities and sixth set of securities using the third fund; and the third range is optionally adjacent to the second range, and overlaps by no more than one day.

The system includes an optional feature whereby the second range is not adjacent to the first range.

The system includes an optional feature whereby a first portion of the second range of weighted average maturities is greater than any of the weighted average maturities in the first range, and a second portion of the second range of weighted average maturities is within the first range of weighted average maturities, the second portion comprising a plurality of days.

There has been shown a computer program product computer program product including a computer useable medium having computer readable program code embodied therein for operating a plurality of funds including a first fund and a second fund, the computer program product including computer readable program code devices configured to cause a computer system to identify a first set of at least one security that should be sold from the first fund, and a second set of at least one security that should be purchased for the first fund, so as to cause a weighted average maturity of the first fund to fall within a first range of weighted average maturities advertised to purchasers of the shares of the first fund and to purchasers of shares of the second fund, identify a third set of securities that should be sold from the second fund and a fourth set of securities that should be purchased for the second fund so as to cause a weighted average maturity of the second fund to fall within a second range of weighted average maturities advertised to purchasers of the first fund and to purchasers of the second fund, the second range being different from the first range, trade the first set of securities and second set of securities using the first fund, and trade the third set of securities and fourth set of securities using the second fund.

The computer program product includes an optional feature whereby the second range is comprises a range of weighted average maturities that are greater than, and entirely outside of, the first range of weighted average maturities.

The computer program product includes an optional feature whereby the second range is adjacent to the first range, and overlaps by no more than one day.

The computer program product may additionally include computer readable program code devices configured to cause the computer system to identify a fifth set of at least one security that should be sold from a third fund, and a sixth set of at least one security that should be purchased for the third fund, so as to cause a weighted average maturity of the third fund to fall within a third range of weighted average maturities advertised to purchasers of the shares of the first fund and to purchasers of shares of the second fund and to purchasers of the third fund, and trade the fifth set of securities and sixth set of securities using the third fund, and includes an optional feature whereby the third range is adjacent to the second range, and overlaps by no more than one day.

The computer program product includes an optional feature whereby the second range is not adjacent to the first range.

The computer program product includes an optional feature whereby a first portion of the second range of weighted average maturities is greater than any of the weighted average maturities in the first range, and a second portion of the second range of weighted average maturities is within the first range of weighted average maturities, the second portion comprising a plurality of days.

Any of the above may include a system, method or computer program product that identifies a target weighted average maturity for each of the first and second funds, and optionally the third fund, and the first, second, third, fourth, fifth and sixth sets of at least one security may be identified responsive to the target weighted average maturity for the fund used to trade such sets.

What is claimed is:

1. A computer-based method of operating a plurality of funds including a first fund and a second fund, the plurality of funds each having a characteristic associated therewith, the characteristic being a weighted average duration of a respective one of the plurality of funds, the method comprising:

computing, by a programmed hardware computer processor coupled to a computer memory, the characteristic of the first fund;

comparing, by the programmed hardware computer processor coupled to the computer memory, the characteristic of the first fund computed, with a first range of the characteristic;

determining, by the programmed hardware computer processor coupled to the computer memory, whether the characteristic of the first fund computed is outside the first range of the characteristic;

if the characteristic of the first fund computed is outside the first range of the characteristic, identifying, by the programmed hardware computer processor coupled to the computer memory, a first set of at least one security that should be sold from the first fund, and a second set of at least one security that should be purchased for the first fund, so as to cause the characteristic of the first fund to fall within the first range of the characteristic;

computing, by the programmed hardware computer processor coupled to the computer memory, the characteristic of the second fund;

comparing, by the programmed hardware computer processor coupled to the computer memory, the characteristic of the second fund computed, with a second range of the characteristic;

determining, by the programmed hardware computer processor coupled to the computer memory, whether the characteristic of the second fund computed is outside the second range of the characteristic;

if the characteristic of the second fund computed is outside the second range of the characteristic, identifying, by the programmed hardware computer processor coupled to the computer memory, a third set of at least one security that should be sold from the second fund and a fourth set of at least one security that should be purchased for the second fund so as to cause the characteristic of the second fund to fall within the second range of the characteristic, the second range of the characteristic being different from the first range of the characteristic;

trading the first set of at least one security and the second set of at least one security using the first fund; and trading the third set of at least one security and the fourth set of at least one security using the second fund.

2. The method of claim 1, wherein the second range is a range that is greater than, and entirely outside of, the first range.

3. The method of claim 1, wherein the second range is adjacent to the first range, and overlaps by no more than one day.

4. The method of claim 3: additionally comprising:
identifying a fifth set of at least one security that should be sold from a third fund, and a sixth set of at least one security that should be purchased for the third fund, so as to cause the characteristic of the third fund to fall within a third range of the characteristic; and
trading the fifth set of at least one security and the sixth set of at least one security using the third fund; and
wherein the third range is adjacent to the second range, and overlaps by no more than one day.

5. The method of claim 1, wherein the second range is not adjacent to the first range.

6. The method of claim 1, wherein a first portion of the second range is greater than the first range, and a second portion of the second range is within the first range, the second portion comprising a plurality of days.

7. A system for operating a plurality of funds including a first fund and a second fund, the plurality of funds each having a characteristic associated therewith, the characteristic being a weighted average duration of a respective one of the plurality of funds, the system comprising:
a memory and at least one processor, the at least one processor configured to execute code stored in the memory to that configures the system to,
compute the characteristic of the first fund,
compare the characteristic of the first fund computed, with a first range of the characteristic,
determine whether the characteristic of the first fund computed is outside the first range of the characteristic,
if the characteristic of the first fund computed is outside the first range of the characteristic, identify a first set of at least one security that should be sold from the first fund, and a second set of at least one security that should be purchased for the first fund, so as to cause the characteristic of the first fund to fall within the first range of the characteristic,
compute the characteristic of the second fund,
compare the characteristic of the second fund computed, with a second range of the characteristic,
determine whether the characteristic of the second fund computed is outside the second range of the characteristic,
if the characteristic of the second fund computed is outside the second range of the characteristic, identify a third set of at least one security that should be sold from the second fund and a fourth set of at least one security that should be purchased for the second fund so as to cause the characteristic of the second fund to fall within the second range of the characteristic, the second range of the characteristic being different from the first range of the characteristic,
trade the first set of at least one security and the second set of at least one security using the first fund, and
trade the third set of at least one security and the fourth set of at least one security using the second fund.

8. The system of claim 7, wherein the second range is a range that is greater than, and entirely outside of, the first range.

9. The system of claim 7, wherein the second range is adjacent to the first range, and overlaps by no more than one day.

10. The system of claim 9, wherein the at least one processor is further configured to cause the system to:
identify a fifth set of at least one security that should be sold from a third fund, and a sixth set of at least one security that should be purchased for the third fund, so as to cause the characteristic of the third fund to fall within a third range of the characteristic; and
trade the fifth set of at least one security and the sixth set of at least one security using the third fund, wherein the third range is adjacent to the second range, and overlaps by no more than one day.

11. The system of claim 7, wherein the second range is not adjacent to the first range.

12. The system of claim 7, wherein a first portion of the second range is greater than the first range, and a second portion of the second range is within the first range of, the second portion comprising a plurality of days.

13. A non-transitory computer readable medium having computer readable program code embodied therein that, when executed by a processor of a system, configures the system to operate a plurality of funds including a first fund and a second fund, the plurality of funds each having a characteristic associated therewith, the characteristic being a weighted average duration of a respective one of the plurality of funds, the system configured to operate the plurality of funds by:
computing the characteristic of the first fund;
comparing the characteristic of the first fund computed, with a first range of the characteristic;
determining whether the characteristic of the first fund computed is outside the first range of the characteristic;
if the characteristic of the first fund computed is outside the first range of the characteristic, identifying a first set of at least one security that should be sold from the first fund, and a second set of at least one security that should be purchased for the first fund, so as to cause the characteristic of the first fund to fall within the first range of the characteristic;
computing the characteristic of the second fund;
comparing the characteristic of the second fund computed, with a second range of the characteristic;
determine whether the characteristic of the second fund computed is outside the second range of the characteristic;

if the characteristic of the second fund computed is outside the second range of the characteristic, identifying a third set of at least one security that should be sold from the second fund and a fourth set of securities that should be purchased for the second fund so as to cause the characteristic of the second fund to fall within the second range of the characteristic, the second range being different from the first range;

trading the first set of at least one security and the second set of at least one security using the first fund; and trading the third set of at least one security and the fourth set of at least one security using the second fund.

14. The non-transitory computer readable medium of claim 13, wherein the second range is greater than, and entirely outside of, the first range.

15. The non-transitory computer readable medium of claim 13, wherein the second range is adjacent to the first range, and overlaps by no more than one day.

16. The non-transitory computer readable medium of claim 15, additionally comprising computer readable program code devices configured to cause the system to:

identify a fifth set of at least one security that should be sold from a third fund, and a sixth set of at least one security that should be purchased for the third fund, so as to cause the characteristic of the third fund to fall within a third range of the characteristic; and trade the fifth set of at least one security and the sixth set of at least one security using the third fund; and wherein the third range is adjacent to the second range, and overlaps by no more than one day.

17. The non-transitory computer readable medium of claim 13, wherein the second range is not adjacent to the first range.

18. The non-transitory computer readable medium of claim 13, wherein a first portion of the second range is greater than the first range, and a second portion of the second range is within the first range, the second portion comprising a plurality of days.

* * * * *